United States Patent
Danilov et al.

(10) Patent No.: US 10,789,140 B2
(45) Date of Patent: *Sep. 29, 2020

(54) FACILITATION OF REPLICATION PROGRESS TRACKING

(71) Applicant: EMC IP Holding Company LLC, Hopkinton, MA (US)

(72) Inventors: Mikhail Danilov, Saint Petersburg (RU); Alexander Rakulenko, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/259,393

(22) Filed: Jan. 28, 2019

(65) Prior Publication Data

US 2019/0155707 A1 May 23, 2019

Related U.S. Application Data

(63) Continuation of application No. 15/654,129, filed on Jul. 19, 2017, now Pat. No. 10,235,257.

(51) Int. Cl.
| | |
|---|---|
| *G06F 12/00* | (2006.01) |
| *G06F 11/20* | (2006.01) |
| *G06F 11/14* | (2006.01) |
| *G06F 13/00* | (2006.01) |
| *G06F 13/28* | (2006.01) |

(52) U.S. Cl.
CPC ...... *G06F 11/2071* (2013.01); *G06F 11/1458* (2013.01); *G06F 11/2094* (2013.01); *G06F 11/2097* (2013.01); *G06F 11/1446* (2013.01); *G06F 11/2076* (2013.01); *G06F 11/2082* (2013.01); *G06F 2201/855* (2013.01)

(58) Field of Classification Search
CPC ............ G06F 11/2071; G06F 11/1458; G06F 11/2097; G06F 11/2094; G06F 11/1446; G06F 11/2076; G06F 11/2082; G06F 2201/855

See application file for complete search history.

(56) References Cited

U.S. PATENT DOCUMENTS

| | | |
|---|---|---|
| 8,612,700 B1 | 12/2013 | Armstrong et al. |
| 2004/0030822 A1 | 2/2004 | Rajan et al. |
| 2005/0021566 A1 | 1/2005 | Mu |
| 2015/0112939 A1 | 4/2015 | Cantwell et al. |
| 2017/0078311 A1 | 3/2017 | Clark et al. |

OTHER PUBLICATIONS

Non-Final Office Action received for U.S. Appl. No. 15/654,129 dated Aug. 27, 2018, 13 pages.

*Primary Examiner* — Mark A Giardino, Jr.
(74) *Attorney, Agent, or Firm* — Amin, Turocy & Watson, LLP

(57) ABSTRACT

Elastic Cloud Storage (ECS) uses a specific method for disk capacity management, where disk space is partitioned into a set of blocks of fixed size called chunks. Chunk data can comprise user data and all kinds of metadata. The replication mechanism implemented in ECS works at the chunk level. However, object level data can be used to provide visibility for client applications. Thus, object arrival can be determined to track replication progress at the object level for systems with a replication mechanism that works at the chunk level.

20 Claims, 10 Drawing Sheets

FACILITATION OF REPLICATION PROGRESS TRACKING

RELATED APPLICATION

The subject patent application is a continuation of, and claims priority to, U.S. patent application Ser. No. 15/654,129 (now U.S. Pat. No. 10,235,257), filed Jul. 19, 2017, and entitled "FACILITATION OF REPLICATION PROGRESS TRACKING," the entirety of which application is hereby incorporated by reference herein.

TECHNICAL FIELD

The subject disclosure relates generally to replication progress tracking. More specifically, this disclosure relates to tracking replication progress within an Elastic Cloud Storage system.

BACKGROUND

Elastic Cloud Storage (ECS) uses the latest trends in software architecture and development to achieve increased availability, capacity use efficiency, and performance. ECS uses a specific method for disk capacity management. Disk space is partitioned into a set of blocks of fixed size called chunks. User data is stored in these chunks and the chunks are shared. One chunk can contain fragments of several user objects. Chunk content is modified in an append mode. When chunks become full, they are sealed and the content of sealed chunks is immutable.

There are different types of chunks, one type per capacity user. In particular, user data is stored in repository chunks. All the metadata is stored in tree-like structures. These trees are stored in tree chunks. Chunks of each type are shared. For instance, one repository chunk can contain segments of several user objects, and one tree chunk can contain elements of several trees. This approach assures high write performance and capacity efficiency.

The above-described background relating to ECS is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to facilitation of replication progress tracking. In one example embodiment, a system is disclosed that comprises a processor and a memory that stores executable instructions that, when executed by the processor, facilitate performance of operations. Moreover, the operations comprise replicating first data associated with an object from a first data structure associated with a first zone of a data store to a second data structure associated with a second zone of the data store. The operations also comprise storing the first data in the second data structure and replicating second data associated with the object from a third data structure associated with the first zone to a fourth data structure associated with the second zone. Furthermore, the operations comprise storing the object with the fourth data structure and in response to the storing the object with the fourth data structure, generating a request to store the object with the second data structure.

Another example embodiment of the specification relates to a method that comprises receiving, by a device comprising a processor, first metadata of an object created in a first zone of a data store, and storing, by the device, the first metadata in a first data structure associated with a second zone of the data store different than the first zone. According to an aspect, the method comprises receiving, by the device, second metadata associated with the object in the first zone and analyzing, by the device, the second metadata. The method also comprises in response to the receiving the second metadata and based on a result of the analyzing of the second metadata, generating third metadata, associated with the object, in a second data structure associated with the second zone.

Another example embodiment of the specification relates to a computer-readable storage medium comprising instructions that, in response to execution, cause a server device comprising a processor to perform operations, comprising facilitating sending first data from a first data structure associated with a first zone of a data store to a second data structure associated with a second zone of the data store, wherein the first data is associated with an object. The operations further comprise facilitating storing the first data with the second data structure and facilitating sending second data from a third data structure associated with the first zone to a fourth data structure associated with the second zone, wherein the second data is associated with the object. Moreover, the operations comprise facilitating storing the object with the fourth data structure, and in response to the storing the object with the fourth data structure, storing the object with the second data structure.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
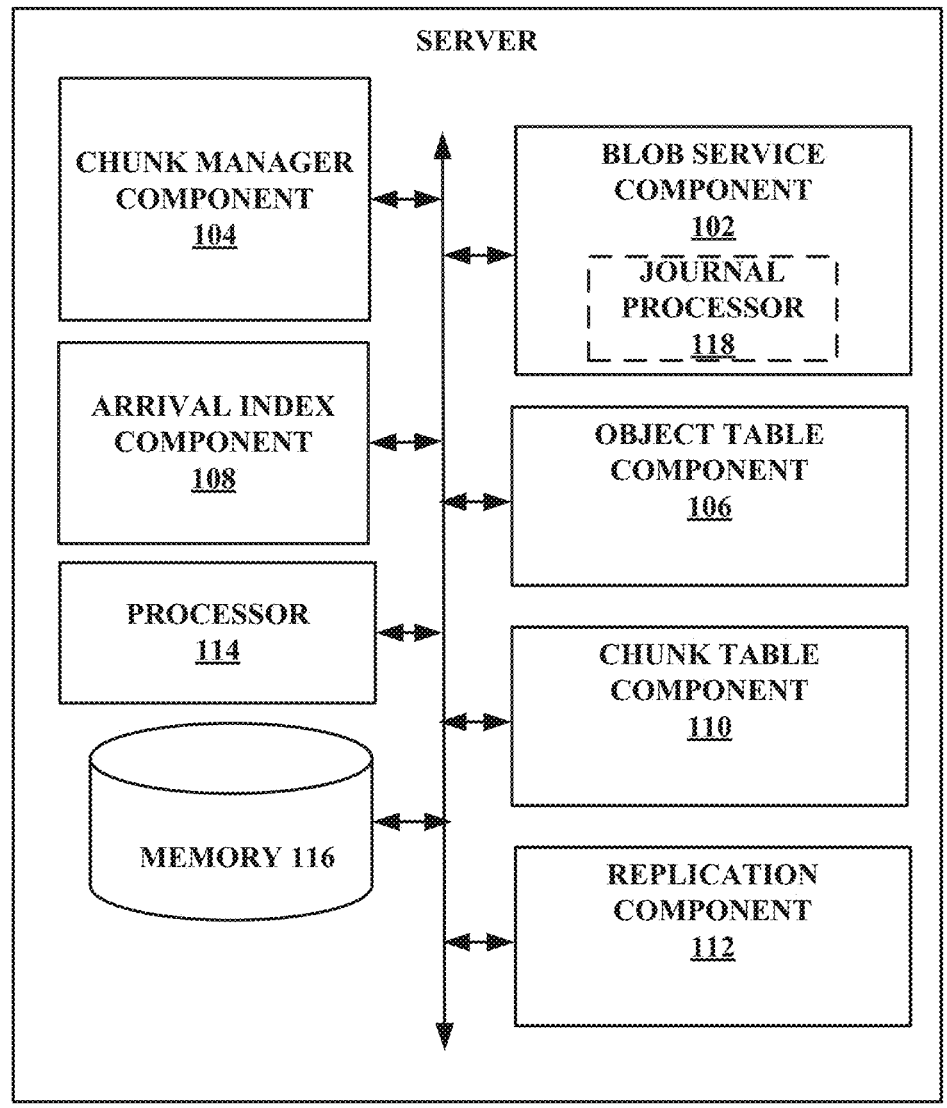
FIG. 1 illustrates an example server configured to perform replication progress tracking.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

A replication mechanism that works at the chunk level can be implemented to meet customers' visibility requirements. Namely, many customers, (e.g., financial institutions) want to ensure that an object written to a first zone can become available at a second zone. For example, a zone can maintain its index and compare its content with a list of objects that are created in a remote zone to ensure that the objects created in the remote zone are replicated at the zone. To facilitate this process, customers would prefer to query the second zone for a list of objects that arrived at the second zone recently and compare this list with a list of objects written to the first zone. Currently, it is difficult for ECS to register arrival of an object with replication working at the chunk level. Thus, a method to track replication progress within ECS at the object level can be used to meet customer requests, wherein the method requires a minimal amount of per-object checks to be performed and minimal interactions between storage services. This process can determine the status of arrived objects and make the status available without additional checks.

ECS can run a set of storage services, which all together implement business logic of storage. A blob service can manage user data at the object level and translate objects into other representations (i.e., chunks). It can maintain an object table that keeps track of all objects in the system. In particular, the object table can comprise objects' location information. Additionally, a chunk manager service can maintains a chunk table, allocate capacity of chunks, tracks chunks, perform garbage collection, etc., at the chunk level. However, at the chunk level, the server is not aware of objects at the object level.

The object table and the chunk table can be implemented as search trees under a multi-version concurrency control policy. The search trees are large so the major part of each tree can reside on hard drives, therefore a single tree update can be an expensive operation. Consequently, trees are not updated for a single data update. Each tree has a journal of data updates. Tree journals can be stored in journal chunks. Journal chunks are different types of chunks that keep small records (i.e., 128 mb) and updates to trees. Because the journals are small, it is more efficient to copy data between zones in bulk modes (i.e., can replicate 128 mb of data instead of sending millions of records). A journal processor associated with the journals can implement bulk tree updates in order to minimize the total cost of the update.

For geographically distributed setups (GEO), supported by ECS, can comprise two or more zones. GEO can be used to provide an additional protection of user data by means of replication. However, ECS does not replicate objects. The replication mechanism works at the chunk level. Namely, ECS replicates repository chunks with user data and journal chunks with system and user metadata. The chunk manager service at a replication target zone can register incoming chunks, and various services like the blob service and the chunk manager can "re-play" journals that the zone receives from other zones and update their local trees (i.e., tables).

To track replication progress at the object level for systems with a replication mechanism that works at the chunk level, object arrival and arrival time can be determined. For example, some object created within a first zone arrived can be determined to have arrived at a second zone when a client application can read the object solely from the second zone. This scenario is possible when the second zone contains all the data and metadata for the object. However, there are two conditions to be satisfied to determine if the object has arrived at the second zone. The first condition can be fulfilled when the second zone has received the repository chunks that contain segments of the object and the repository chunks were registered (i.e., stored) by the second zone in its chunk table. The second condition can be fulfilled when the second zone has received and replayed all of the journal chunks with system and user metadata for the object. Consequently, the object table contains an entry for the object.

Because replication of chunks works asynchronously, in parallel, and the replication order is not specified, it can be difficult to detect when both conditions are satisfied. However, since repository chunks contain no identification (ID) information for objects they contain, replication progress tracking can be driven by the blob service on the basis of object metadata being replicated from remote zones.

The blob service can replay (i.e., analyze) the journals received from the remote zones via replication. When another journal entry contains information about a new object, the blob service can perform an arrival check. During the arrival check, the blob service can analyze all the repository chunks that contain the segments of the new object and check to determine if they have been registered by chunk manager in the capacity of the replicated chunks. Object location information can also be taken directly from the journal. If it is determined that all of the repository chunks are registered already, the blob service can register the current time as the arrival time for the object. Alternatively, if one or more of the repository chunks are not registered yet, the blob service can request the chunk manager to register the object as one that "comes to meet" the missing chunks. The chunk manager can register all such objects in its chunk table. For example, the chunk table can contain the following key-value pair: ID of the missing chunk and the list of IDs of pending objects.

The chunk manager can register the repository chunks, which are replicated from remote zones. For each repository chunk, the chunk manager can check if the chunk table contains the ID of the chunk already. If it is determined that the chunk table contains the ID already, then, most probably, there are objects waiting for the chunk to come. Consequently, the chunk manager can assess all of the objects registered in the chunk table and inform the blob service about the chunk registration and the objects so that the blob service can reiterate arrival check for the objects. Alternatively, if the chunk table does not contain the ID, then, most probably, the repository chunk came to the zone first, before the journal chunks for it were replicated and/or re-played. In this case, the chunk manager can register the repository chunk in the chunk table.

Referring initially to FIG. 1, there illustrated is an example server 100 configured to perform replication progress tracking. The server 100 can comprise a blob service component 102 comprising a journal processor 118, a chunk manager component 104, an object table component 106, an arrival index component 108, a chunk table component 110, and a replication component 112. It should also be noted that in alternative embodiments that these or other components can be external to the server 100. For example, the journal processor 118 can be external to the blob service component 102 and act as a stand-alone processor.

The ECS can comprise a set of storage services, to implement business logic of the storage, referred to as a blob service and a chunk manager service. The blob service component 102 can manage user data at the object level and translate objects into other representations (e.g., data chunks). The blob service component 102 can also maintain the object table component 106, which keeps track of all objects in the system. In particular, the object table component 106 can comprise object location information associated with each object. The chunk manager component 104 is a service that manages the chunk table component 110. The chunk table component 110 can store data at the chunk level regarding the allocation capacity of chunks, chunk location, chunk tracking, garbage collection, etc. It should be understood that the chunk manager component 104 and the blob service component 102 are capable of bi-directional communication with each other.

The blob service component 102 can analyze journals, via the journal processor 118, received from remote zone's via the replication process. In order to replicate a data chunk via the replication component 112, the server 100 can create copies of all of the data chunks associated with remote zones. The copies of the data chunks can then be used to generate coding chunks or other data chunks. It should be noted that replicating the data chunks can occur by copying the data chunks at their respective zones and then sending a copied data chunk to a remote zone, or the remote zone can be in bi-directional communication with a first zone, wherein a copy of the data chunk of the first zone is created remotely at the remote zone. It should be further noted that peer chunks can be replicated to one or more zones either simultaneously or linearly. When another journal entry contains information about a new object, the blob service component 102 can perform an arrival check by checking the repository chunks that contain segments of the new object to determine if they have been registered (i.e., stored) by the chunk manager component 104 at the chunk table component 110. If the repository chunks are already stored at the chunk table component 110, the blob service component 102 can register the current time as the arrival time for the object via the arrival index component 108. However, if one or more of the repository chunks are not stored in the chunk table component, then the blob service component 102 can request that the chunk manager component 104 store the object in the chunk table component 110.

The chunk manager component 104 can store repository chunks, replicated from remote zones, in the chunk table component 110. For each repository chunk, the chunk manager component 104 determine if the chunk table component 110 contains the identification of the repository chunk. If the chunk table component 110 contains the identification of the repository chunk, then the chunk manager component 104 can inform the blob service component 102 about the repository chunk registration and the associated object(s) so that the blob service component 102 can re-perform the arrival check for the object(s). However, if the chunk table component 110 does not contain the identification of the repository chunk, then the chunk manager component 104 can store the repository chunk in the chunk table component 110.

Aspects of the processor 114 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. In an aspect, the server 100 can also include memory 116 that stores computer executable components and instructions.

Figure 2:
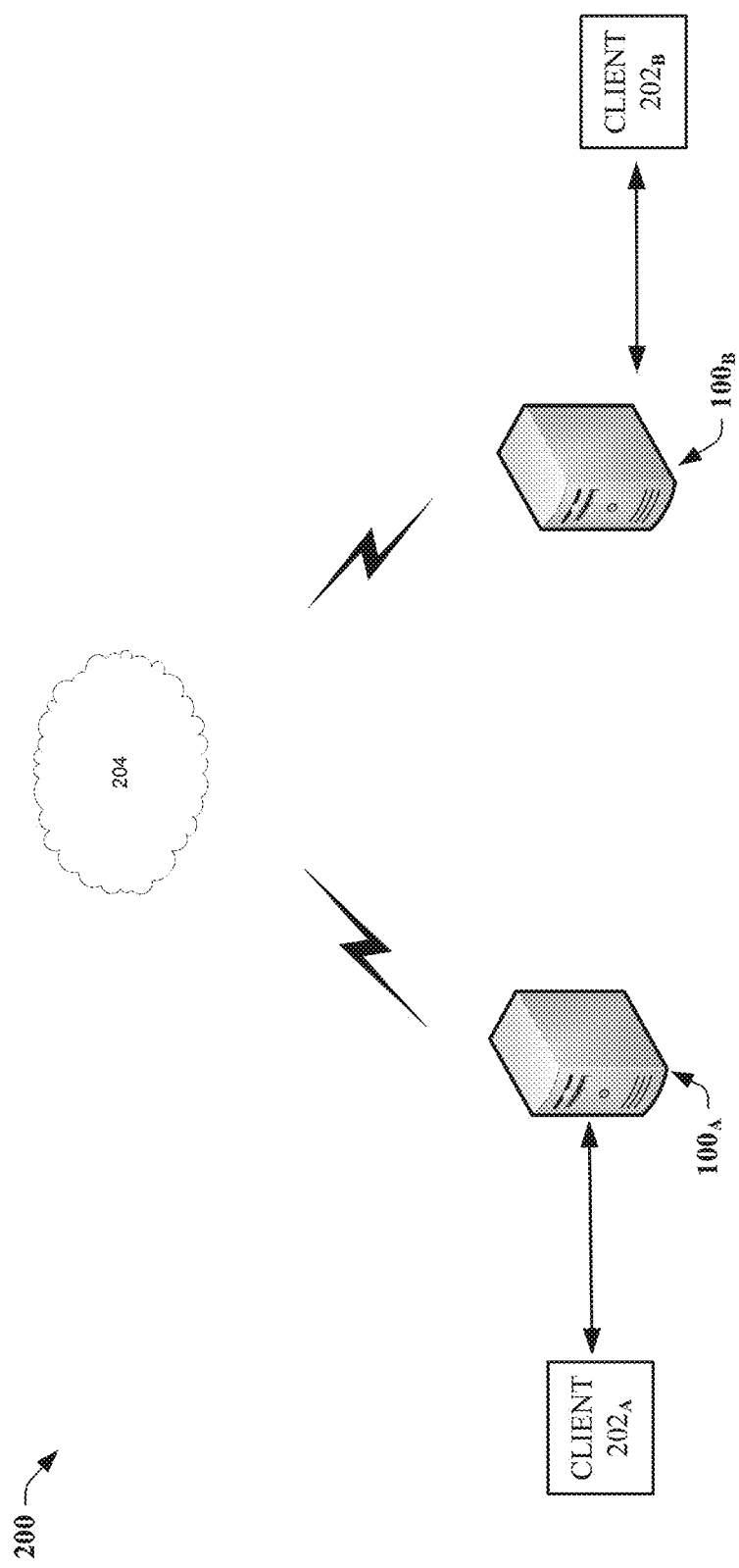
FIG. 2 illustrates an example server system that can facilitate replication progress tracking for multiple servers.

Referring now to FIG. 2, there is illustrated an example server system 200 that can facilitate replication progress tracking for multiple servers. The systems and methods disclosed herein can take place on one or multiple servers. The ECS 204 can facilitate communication between multiple servers $100_A$, $100_B$. The multiple servers $100_A$, $100E$ can serve multiple client applications. The server $100_A$ can serve client application $202_A$ and the server $100_B$ can serve client application $202_B$. For example, the client application $202_A$ may want to ensure that an object written to a first zone (e.g., zone A) associated with the client application $202_A$ is available at a second zone (e.g., zone B) associated with the server $100_A$. Consequently, this can prompt a query of the second zone for a list of objects that arrived at the second zone to compare the objects at the second zone with the objects at the first zone.

Figure 3:
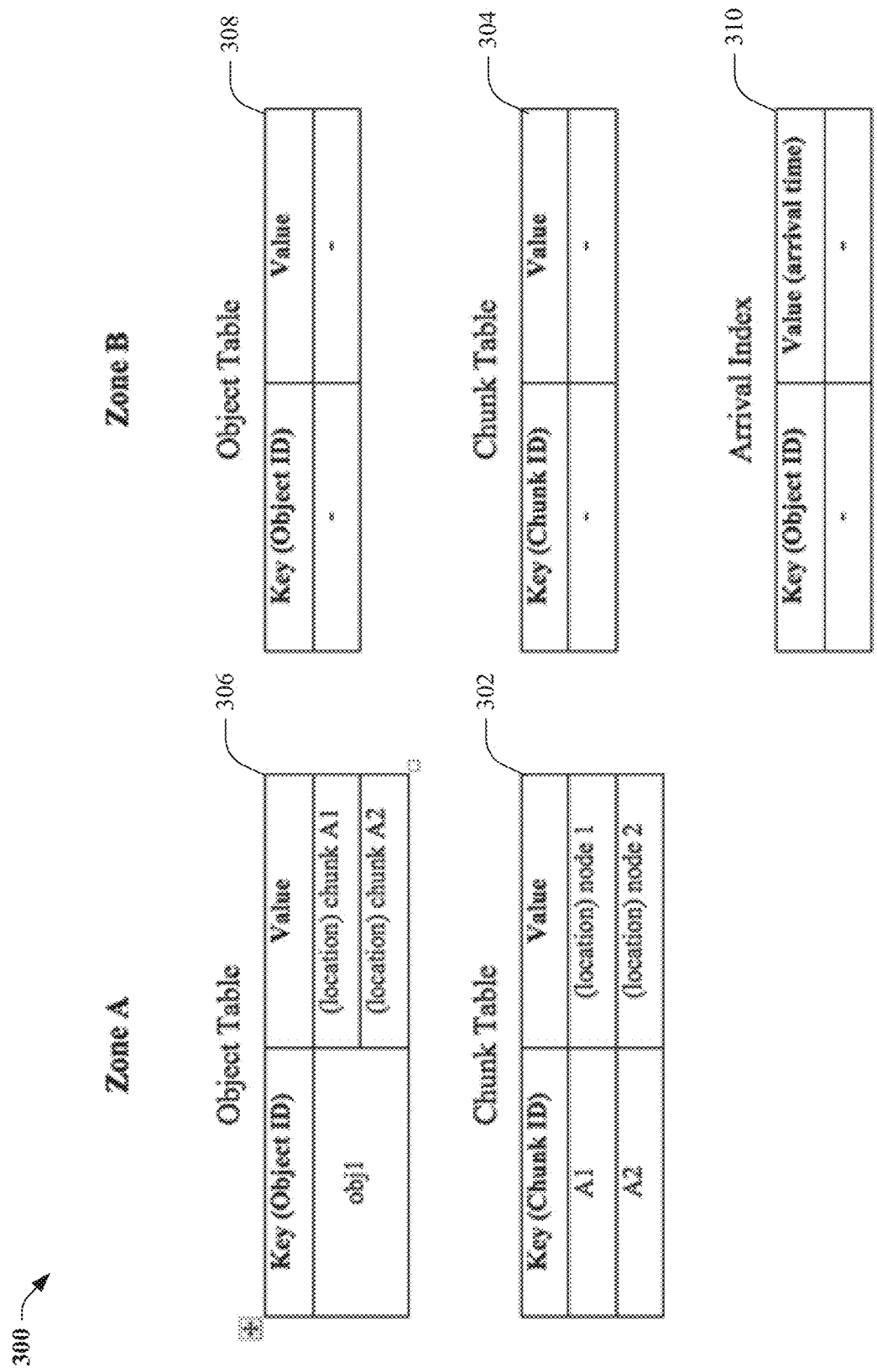
FIG. 3 illustrates an example replication progress tracking system at an initial state.

FIG. 3 illustrates an example replication progress tracking system 300 at an initial state. Geographically distributed ECS storage can comprise two zones, zone A and zone B. An object with ID obj1 can be created within zone A. The object data can be separated into two chunks, chunk A1 and chunk A2 as referenced by FIG. 3, within the object table 306. The object table 306 and the chunk table 302 contain information about the object and the two chunks. Since chunk replication has not occurred yet, object table 308, chunk table 304, and arrival index 310 of zone B are all empty during the initial state as depicted by FIG. 3.

Figure 4:
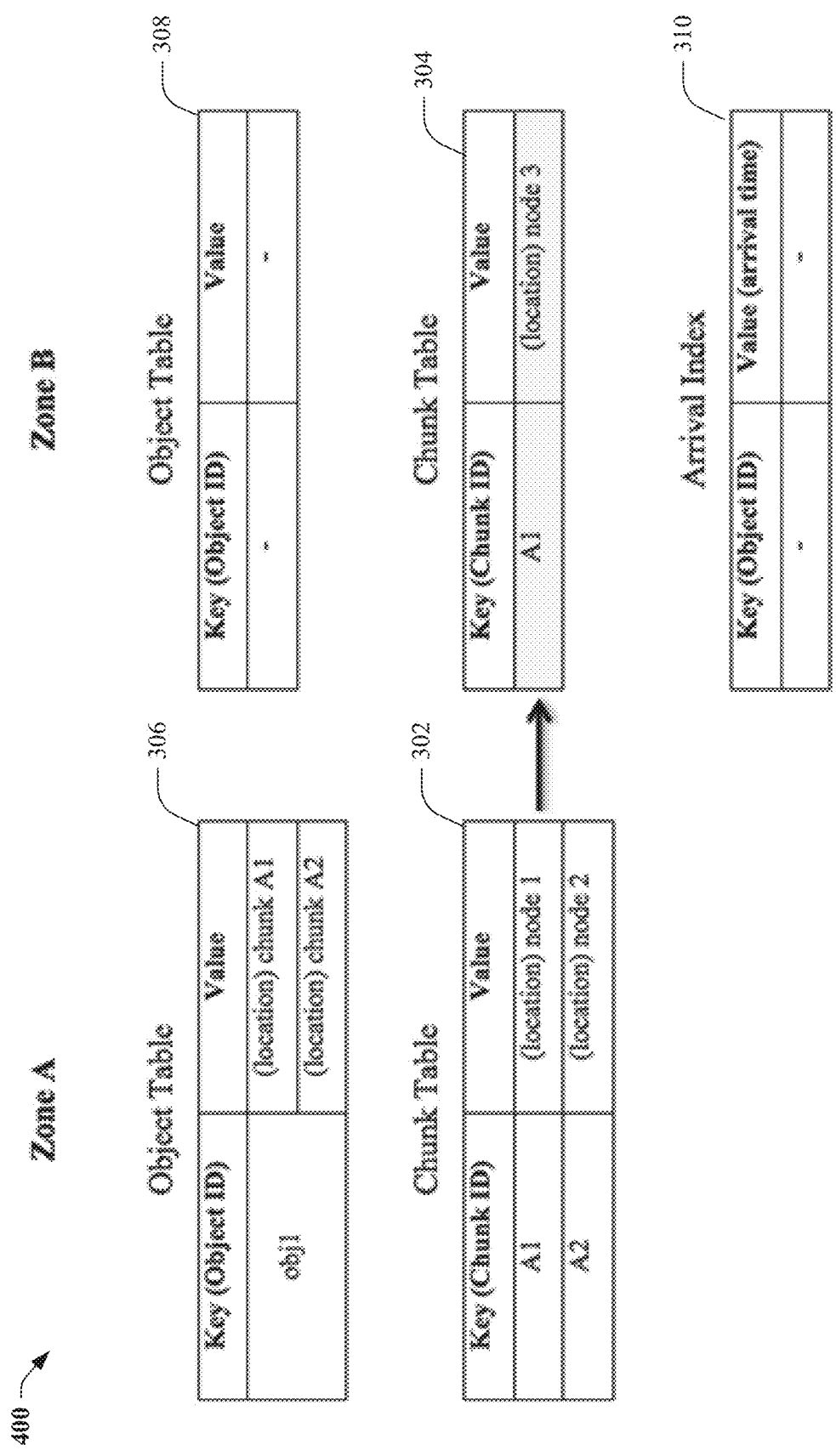
FIG. 4 illustrates an example replication progress tracking system after a first chunk replication has occurred.

Referring now to FIG. 4, there illustrated is an example replication progress tracking system 400 after a first chunk replication has occurred. Because the replication progress tracking system 400 was previously at its initial state in FIG. 3, no object waits for chunk A1 to come at zone B, so the chunk manager component 104 can register chunk A1 in its chunk table 304 (e.g., via the chunk table component 110).

Figure 5:
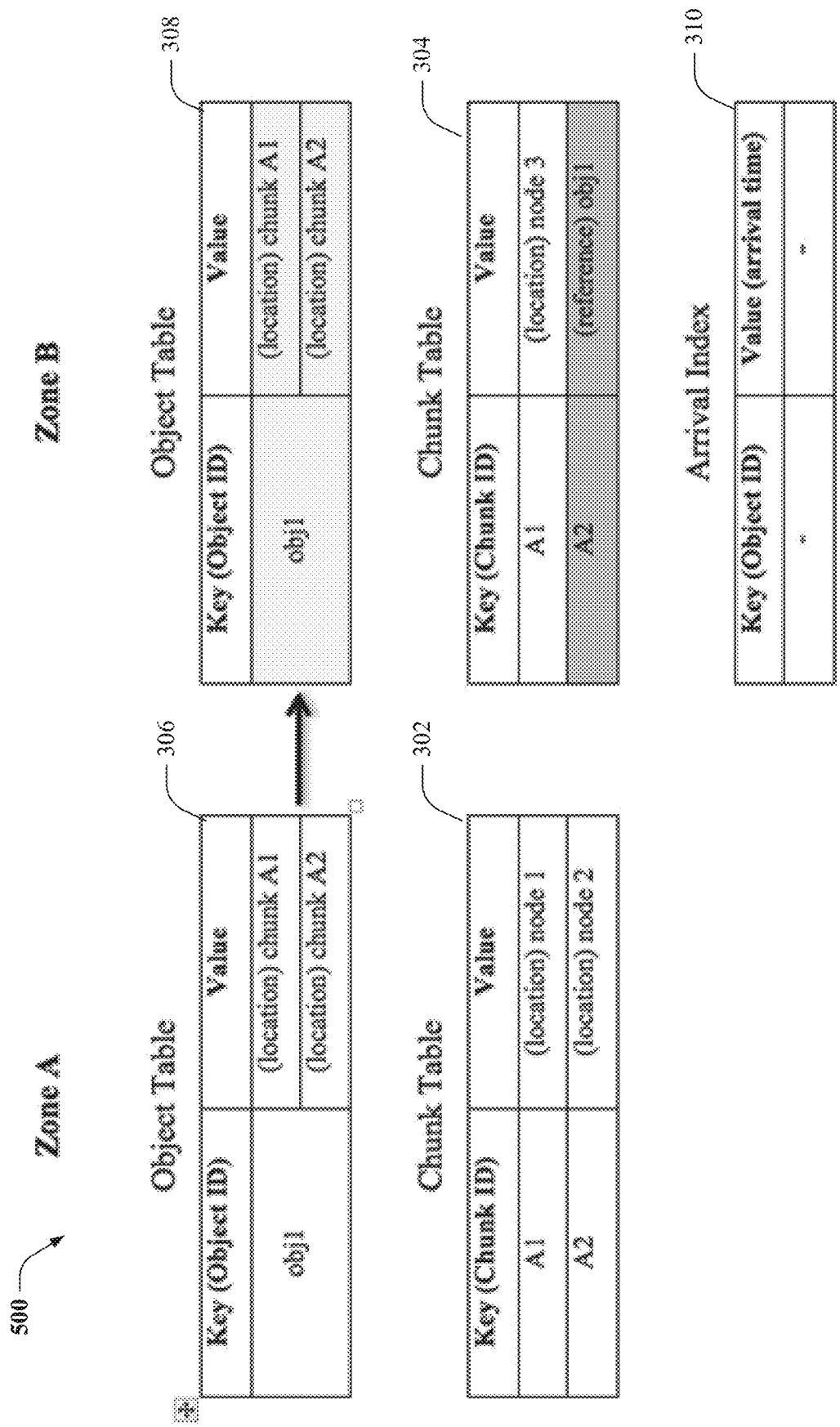
FIG. 5 illustrates an example replication progress tracking system after a journal chunk is replicated from a first zone to a second zone.

Referring now to FIG. 5, there illustrated is an example replication progress tracking system 500 after a journal chunk is replicated from a zone A to zone B. The blob service component 102 at zone B can manage the object table 308 and the object obj1. The blob service component 102 can register the object in the object table 308 and perform an arrival check for the object. The blob service component 102 can find chunk A1 locally in the chunk table 304. However, the blob service component 102 cannot find chunk A2 locally in the chunk table 304, so it requests the chunk manager (e.g., via the chunk manager component 104) to register object obj1 as one that "comes to meet" chunk A2. The chunk manager can then generate (e.g., via the chunk manager component 104) a temporary entry for chunk A2 in the chunk table 304. The value of the temporary entry can be a reference to the object obj1. However, because there is a missing repository chunk (e.g., A2) at zone B, the blob service does not register the object obj1 in arrival index 310.

Figure 6:
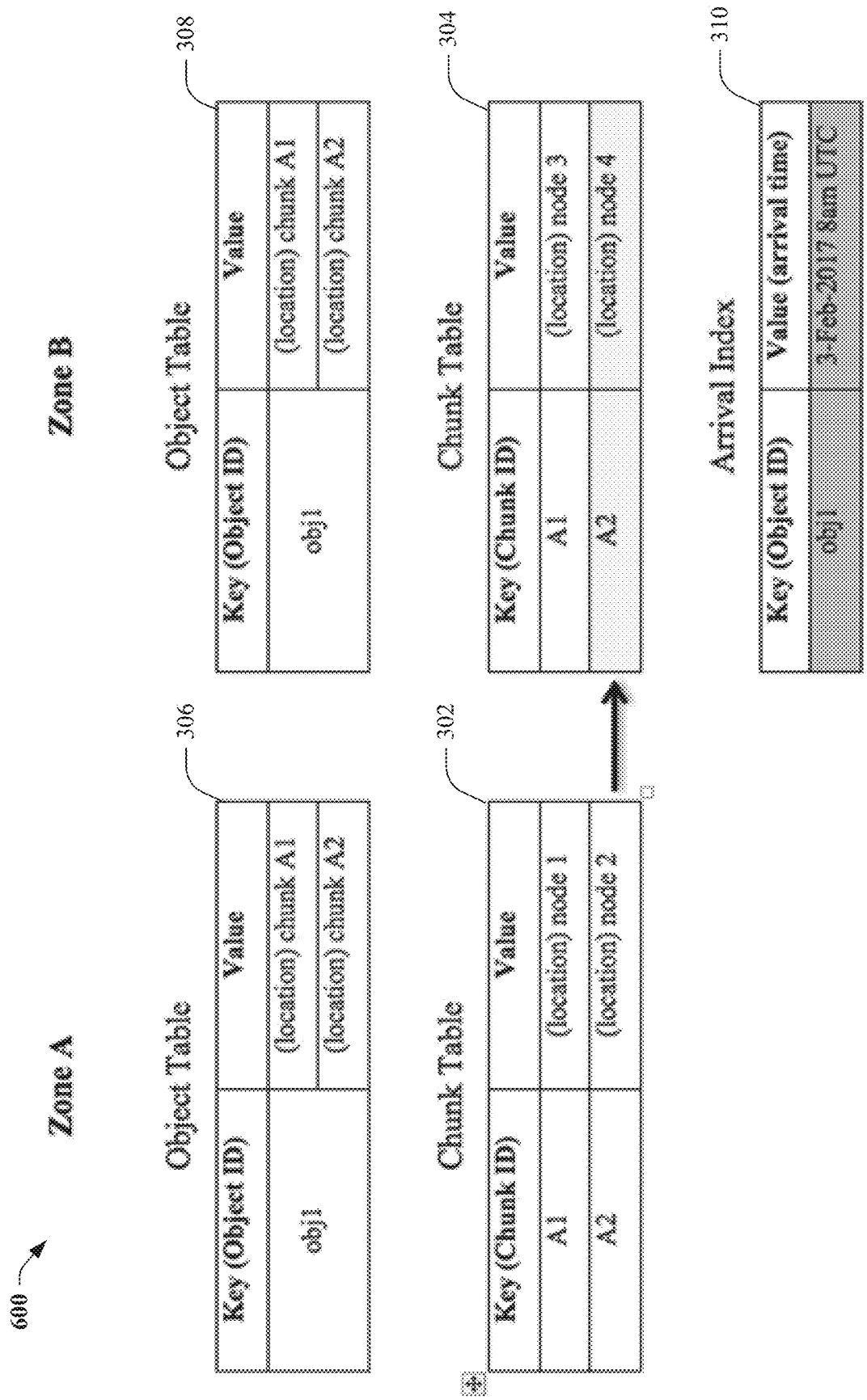
FIG. 6 illustrates an example replication progress tracking system after another chunk is replicated from a first zone to a second zone.

FIG. 6, there illustrated is an example replication progress tracking system 600 after another chunk is replicated from a first zone A to a zone B. The chunk manager for zone B can check (e.g., via the chunk manager component 104) the chunk table 304 and determine that there is object obj1 waiting for chunk A2 (as referenced in FIG. 5). Consequently, the chunk manager can replace the temporary entry for chunk A2 with a permanent entry and inform the blob service about the chunk registration and object obj1 so that the blob service manager can recheck (e.g., via the blob service component 102) for the arrival of object obj1. However, this time during arrival check, the blob service can find all of the chunks referenced by object obj1, so blob service can registers (e.g., via the blob service component 102) object obj1 in its arrival index 310 (e.g., via the arrival index component 108) and set the current time as arrival time of the object.

Figure 7:
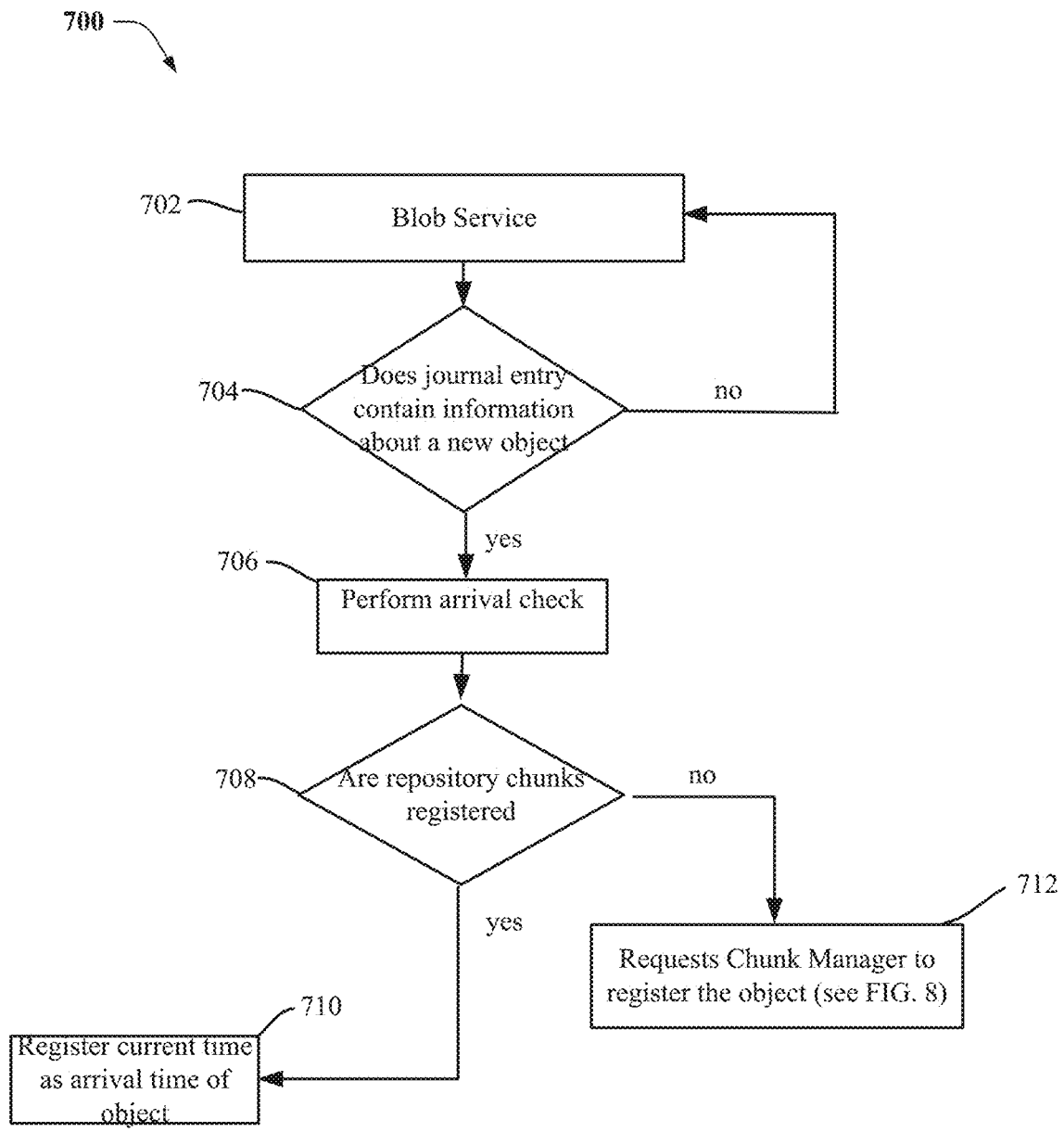
FIG. 7 illustrates an example flow diagram for replication progress tracking based on object metadata.

Referring now to FIG. 7, there illustrated example flow diagram for replication progress tracking 700 based on object metadata. At element 702, the blob service can analyze (i.e., re-plays) journals received from remote zones via the replication process. When another journal entry contains information about a new object at element 704, the blob service can perform an arrival check at element 706. However, if the journal entry does not contain information about a new object, a recursive check can be performed whereby the system can continue to look for such information between elements 702 and 704. To perform the arrival check, the server 100 can check the repository chunks that contain the segments of the new object (this object location information can be taken from the journal as well) and to determine if they have previously been registered by the chunk manager in the capacity of replicated chunks at element 708. If the repository chunks are registered already, the blob service can determine a current time and register the current time as the arrival time for the object at element 710. However, if one or more repository chunks are not registered yet, the blob service can request that the chunk manager register the object as one that is associated with the missing chunks at element 712. The chunk manager can register the object in its chunk table 304. For example, the chunk table 304 can contain the following key-value pair: ID of missing chunk, and list of IDs of pending objects.

Figure 8:
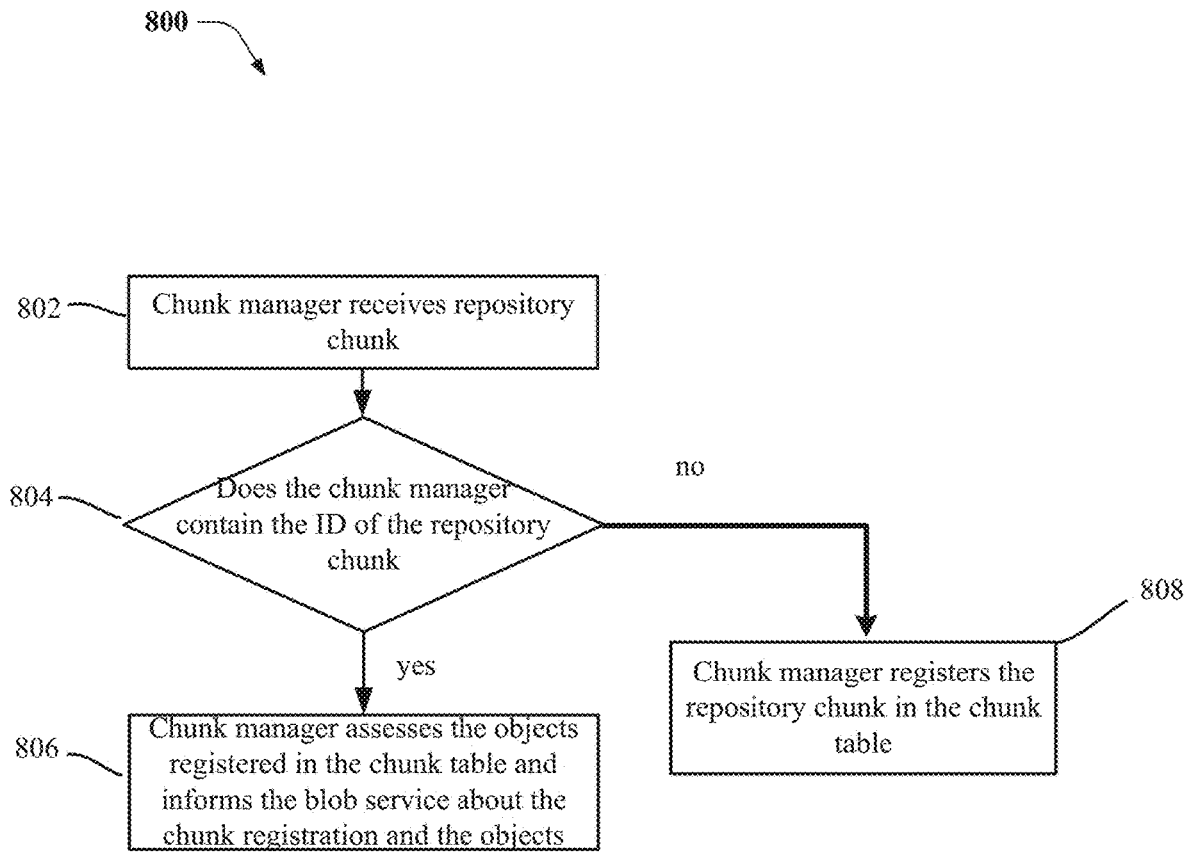
FIG. 8 illustrates an example flow diagram for replication progress tracking based on a request.

FIG. 8 illustrates an example flow diagram 800 for replication progress tracking based on a request. After a request has been made for the chunk manager to register the object as one that is associated with the missing chunks at element 712, the chunk manager can receive a repository chunk at element 802. The repository chunks can be replicated from remote zones. For each chunk, the chunk manager determine if the chunk table 304 contains the ID of the chunk already at element 804. If the chunk table 304 contains the ID already, then, most probably, there are objects waiting for the chunk to come. Consequently, the chunk manager goes over all the objects registered in the chunk table 304 and informs the blob service about the chunk registration and the objects at element 806, so the blob service can reiterate arrival check for the objects. Alternatively, f the chunk table 304 does not contain the ID, then, most probably, the repository chunk came to the zone first, before the journal chunks for the object were replicated. In this case, chunk manager can register the repository chunk in the chunk table 304 at element 808.

An ECS zone, which is a replication target, can maintain a zone-local index of objects sorted by their arrival time. This arrival index 310 can be used to report a list of objects that arrived to the zone recently so that a client application can compare this list with a list of objects written to remote zones.

Figure 9:
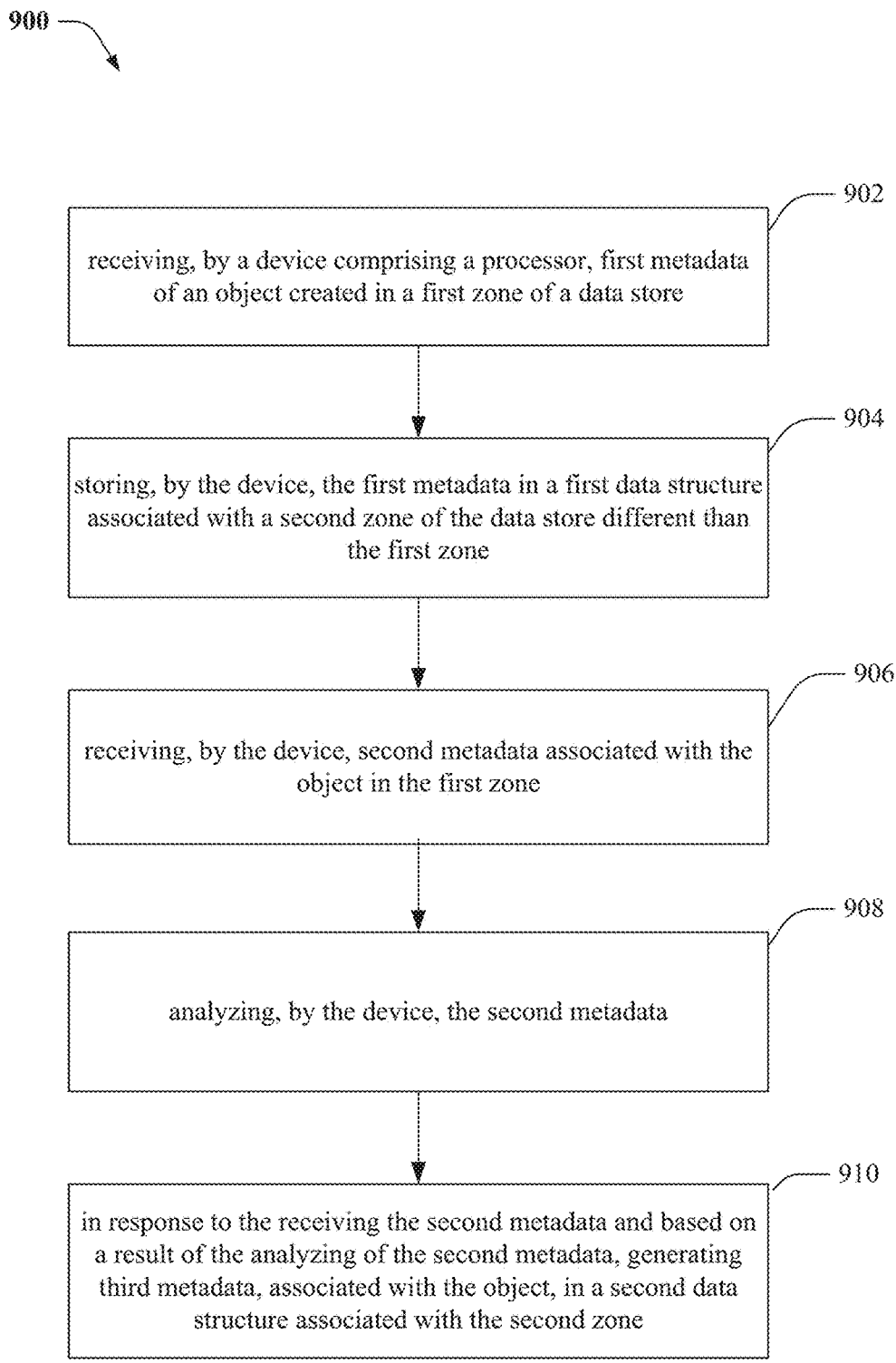
FIG. 9 illustrates an example method that facilitates replication progress tracking.

FIG. 9 illustrates an example method 900 that facilitates replication progress tracking. The method can comprise receiving first metadata of an object created in a first zone of a data store at element 902 (e.g., the object table 306). The method can comprise storing the first metadata in a first data structure (e.g., the chunk table 304) associated with a second zone of the data store different than the first zone at element 904. At element 906, the method can comprise receiving second metadata (e.g., via the object table 308) associated with the object in the first zone and analyzing the second metadata (e.g., via the chunk manager component 104) at element 908. In response to the receiving the second metadata and based on a result of the analyzing of the second metadata, generating third metadata (e.g., via the chunk manager component 104), associated with the object, in a second data structure (e.g., the arrival index 310) associated with the second zone.

Figure 10:
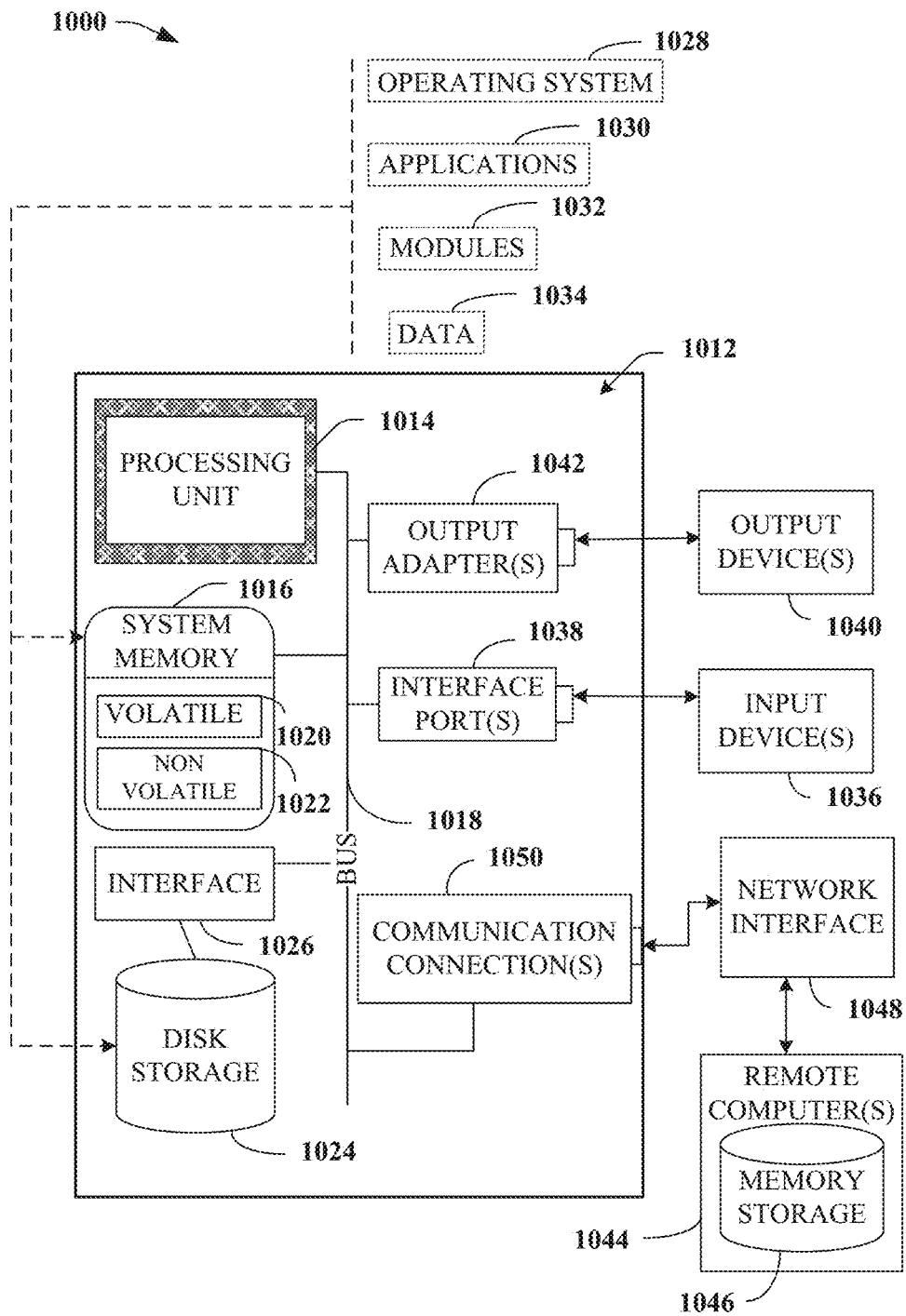
FIG. 10 illustrates a block diagram of an example computer operable to execute the replication progress tracking.

Referring now to FIG. 10, there is illustrated a block diagram of an example computer operable to execute the data deletion for distributed erasure coding. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., server 100, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

The computer 1000 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via the server 100, to dynamically apportion resources described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    storing, by a device comprising a processor, first metadata, of an object created in a first zone of a data store, in a first data structure associated with a second zone of the data store different than the first zone;
    in response to a condition being determined to have been satisfied, determining, by the device, that the first metadata is stored in the first data structure;
    receiving, by the device, second metadata associated with the object in the first zone;
    in response to the receiving the second metadata and based on a result of analyzing the second metadata, generating third metadata, associated with the object, in a second data structure associated with the second zone; and
    in response to the determining that the first metadata is stored in the first data structure, storing a time, associated with the first metadata, in a third data structure.

2. The method of claim 1, further comprising:
    receiving, by the device, the first metadata of the object created in the first zone of the data store.

3. The method of claim 1, further comprising:
    analyzing, by the device, the second metadata to generate the result.

4. The method of claim 1, further comprising:
    generating, by the device, a timestamp, associated with the first metadata.

5. The method of claim 1, further comprising:
    in response to the condition being determined not to have been satisfied, generating, by the device, a request to store the first metadata.

6. The method of claim 1, further comprising:
    in response to the condition being determined to have been satisfied, performing, by the device, an identification check related to the first metadata of the first data structure.

7. The method of claim 1, further comprising:
    based on the condition being determined to have been satisfied, generating, by the device, message data to be sent to a data management service.

8. The method of claim 1, wherein the condition comprises comparing first identification data associated with the second metadata to second identification data associated with the first metadata.

9. The method of claim 1, further comprising:
    in response to the condition being determined not to have been satisfied, storing, by the device, the second metadata.

10. A system, comprising:
    a processor; and
    a memory that stores executable instructions that, when executed by the processor, facilitate performance of operations, comprising:
    replicating first data associated with an object from a first data structure associated with a first zone of a data store to a second data structure associated with a second zone of the data store;
    replicating second data associated with the object from a third data structure associated with the first zone to a fourth data structure associated with the second zone;
    storing the object in the fourth data structure; and
    in response to the storing the object in the fourth data structure, generating a request to store the object in the second data structure.

11. The system of claim 10, wherein the generating is performed in response to third data being determined to not be present within the second data structure.

12. The system of claim 10, wherein the operations further comprise:
    based on third data being determined to not be present, associating the third data with the object.

13. The system of claim 10, wherein the operations further comprise:
    in response to associating third data with the object, generating a temporary fourth data to be inserted into a cell of the second data structure.

14. The system of claim 10, wherein the operations further comprise:
    replicating third data from the first data structure to the second data structure to replace the temporary fourth data.

15. The system of claim 10, wherein the operations further comprise:
    in response to replicating third data from the first data structure to the second data structure to replace the temporary fourth data, generating a time stamp associated with the object.

16. The system of claim 10, wherein the operations further comprise:
    in response to replicating third data from the first data structure to the second data structure to replace the temporary fourth data, comparing the second data structure to the fourth data structure to determine corresponding data.

17. A non-transitory computer-readable storage medium comprising instructions that, in response to execution, cause a server device comprising a processor to perform operations, comprising:
    facilitating sending first data from a first data structure associated with a first zone of a data store to a second data structure associated with a second zone of the data store, wherein the first data is associated with an object;
    facilitating sending second data from a third data structure associated with the first zone to a fourth data structure associated with the second zone, wherein the second data is associated with the object; and in response to storing the object with the fourth data structure, storing the object with the second data structure.

18. The computer-readable storage medium of claim 17, wherein the registering the object with the second data structure comprises generating transient data for an entry of the second data structure.

19. The computer-readable storage medium of claim 17, wherein the operations further comprise:

facilitating sending third data from the first data structure to the second data structure, wherein the third data replaces the transient data.

20. The computer-readable storage medium of claim 17, wherein the operations further comprise:

in response to storing the third data with the second data structure, generating time data associated with the object.

\* \* \* \* \*